Aug. 2, 1966 J. B. KUCERA 3,263,836
BULK MATERIAL HANDLING APPARATUS
Filed Dec. 9, 1963 3 Sheets-Sheet 1
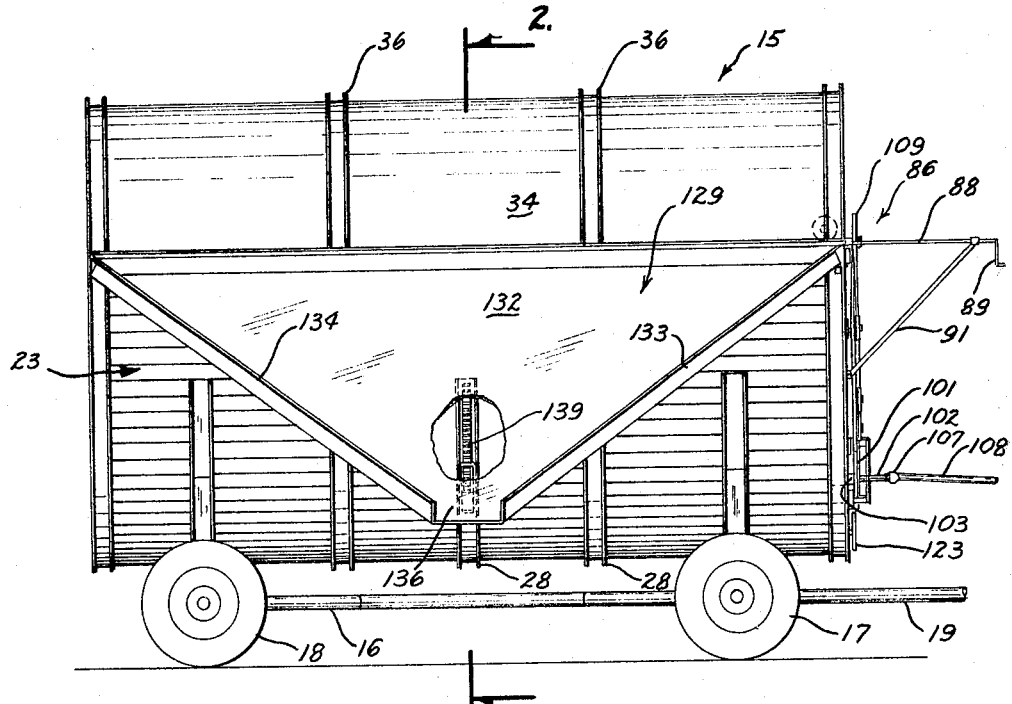
Fig. 1
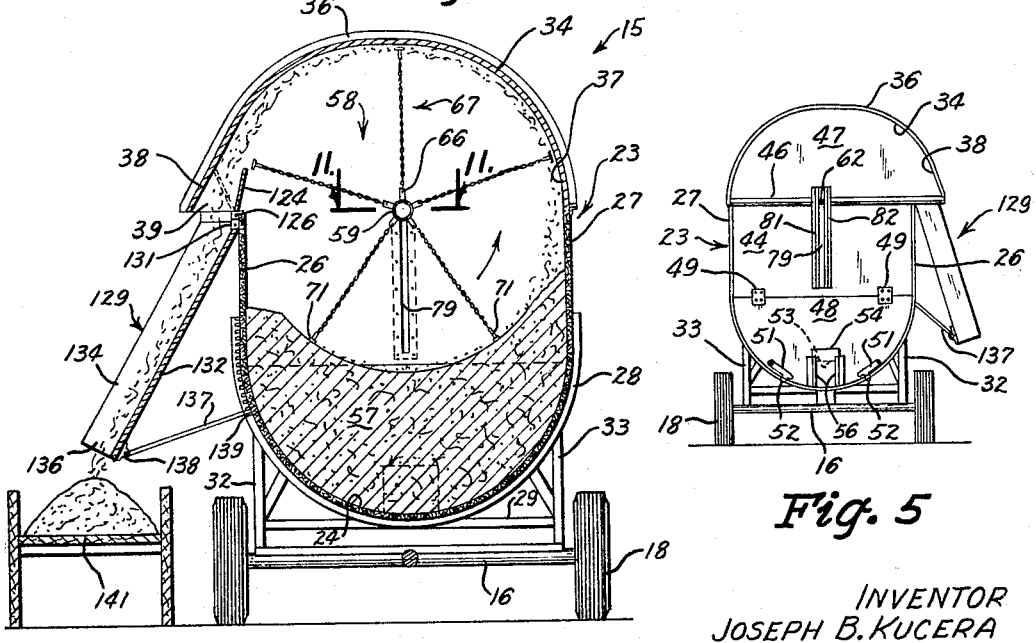
Fig. 2
Fig. 5
INVENTOR
JOSEPH B. KUCERA
BY Rudolph L. Lowell
ATTORNEY Aug. 2, 1966  J. B. KUCERA  3,263,836
BULK MATERIAL HANDLING APPARATUS
Filed Dec. 9, 1963  3 Sheets-Sheet 2

INVENTOR
JOSEPH B. KUCERA
By Rudolph L. Lowell
ATTORNEY

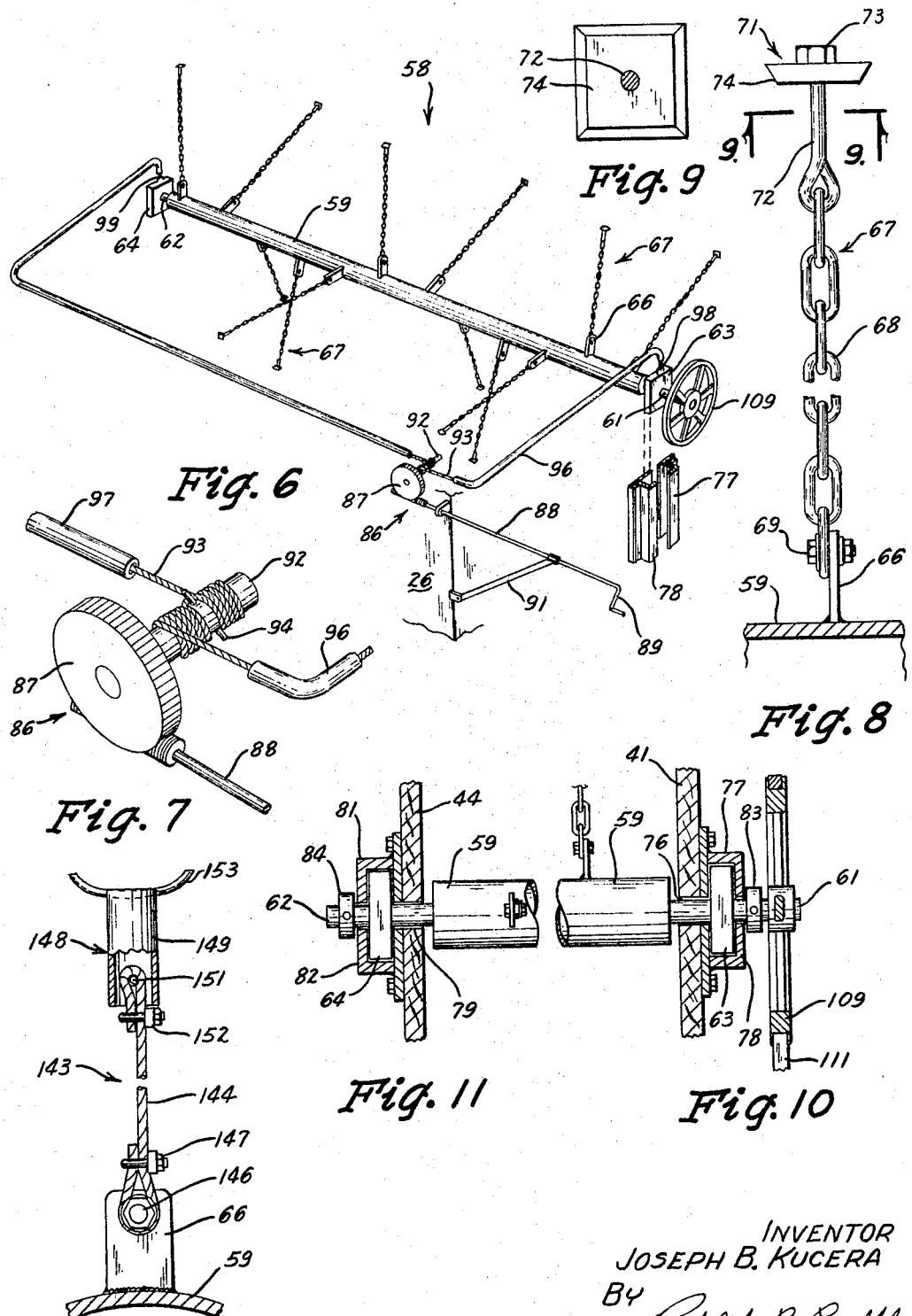

3,263,836
BULK MATERIAL HANDLING APPARATUS
Joseph B. Kucera, Traer, Iowa, assignor of one-third to Eric M. McElhinney, Jesup, Iowa, and one-third to Rudolph L. Lowell, Des Moines, Iowa
Filed Dec. 9, 1963, Ser. No. 329,027
10 Claims. (Cl. 214—83.18)

This invention relates to a bulk material handling vehicle and more particularly to a farm wagon equipped with a driven flail assembly operable to unload bulk material from the wagon.

It is the object of the invention to provide an improved forage handling wagon with a driven flail assembly operable to discharge forage from one side of the wagon.

Another object of the invention is to provide a wagon box with a rotatable flail assembly which is movable toward and away from the bottom wall of the box to regulate the rate of discharge of material from the box.

A further object of the invention is to provide a wagon box having a rotatable flail assembly to discharge bulk material from the box with means to regulate the rate of discharge of material from the box independently of the speed of rotation of the flail assembly.

Still another object of the invention is to provide a wagon box having a semicircular bottom wall with a rotatable flail assembly movable toward and away from the bottom wall and operable to remove substantially all of the bulk material in the box.

An additional object of the invention is to provide an all purpose farm wagon which is rugged in construction and reliable and efficient in use.

These and other objects and advantages of this invention will become readily apparent upon reference to the following description and the accompanying drawing, wherein:

FIG. 1 is a side view of the self-unloading wagon of this invention;

FIG. 2 is a sectional view taken along the line 2—2 of FIG. 1 and illustrates the direction of rotation of the flails and the movement of the bulk material from the wagon;

FIG. 5 is a reduced elevational view of the back of the wagon of FIG. 1;

FIG. 6 is a perspective view of the flail assembly and the winch mechanism used to control the elevation of the flail assembly;

FIG. 7 is an enlarged perspective view of the worm and worm gear winch mechanism of FIG. 6;

FIG. 8 is an enlarged plan view of a chain flail illustrating the connection between the chain and the rotatable shaft and the particular hammer unit secured to the end of the chain;

FIG. 9 is a sectional view taken along the line 9—9 of FIG. 8;

FIG. 10 is an enlarged sectional view taken along the line 10—10 of FIG. 3 illustrating the guide mechanism for the forward end of the flail shaft;

FIG. 11 is an enlarged sectional view taken along the line 11—11 of FIG. 2 illustrating the guide mechanism for the rear end of the flail shaft; and FIG. 12 is a plan view partly in section of a modified type of flail and flail hammer.

Figure 3:
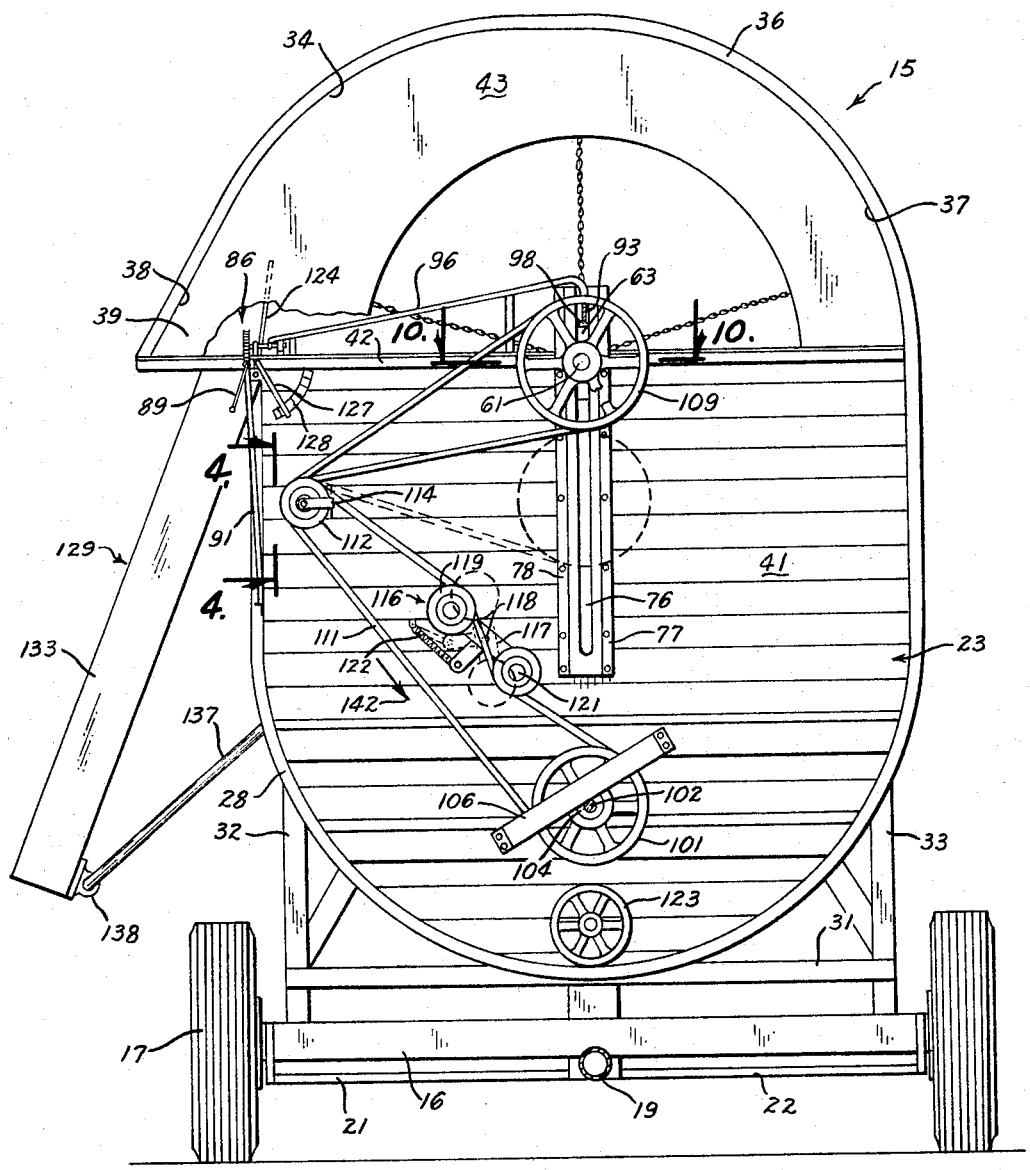
FIG. 3 is an enlarged elevation view of the front of the wagon of FIG. 1 illustrating the drive mechanism for rotating the flails.

Referring to the drawing, there is shown in FIG. 1 a farm wagon 15 for carrying bulk material such as chopped forage and grain. The wagon has a conventional frame structure 16 having front and rear wheel assemblies 17 and 18. A towing and steering tongue 19 extends forwardly from the front portion of the frame 16. The front section of the tongue 19 is adapted to be attached to a vehicle such as a tractor (not shown). Tie rods 21 and 22 couple the tongue 19 with the front wheel assembly 17 such that angular movement of the tongue 19 in a horizontal plane results in the corresponding turning of the front wheel assembly 17.

A wagon box indicated generally by the numeral 23 is mounted on the frame 16 and extends longitudinally between the front and rear wheel assemblies 17 and 18. The box 23 has a generally oval shape in transverse cross section and includes a semicircular bottom wall 24 which is in alignment with upright side walls 26 and 27. The bottom wall 24 and side walls 26 and 27 are formed from a plurality of longitudinally extended side-by-side planks which are secured to U-shaped beams 28 extended around the bottom wall 24. The beams 28 are longitudinally spaced along the length of the box 23 so as to uniformly reinforce the wooden planks of the bottom wall 24 and side walls 26 and 27.

As shown in FIGS. 2 and 3, horizontal beams 29 and 31 project transversely under the U-shaped beams 28 positioned at the rear portion and the forward portion of the box 23. Vertical posts are secured to the opposite ends of the beams 29 and 31 adjacent the wheel assemblies 17 and 18. The top section of the posts 32 and 33 are connected to the opposite portions of the adjacent U-shaped beam 28 thereby rigidly supporting the box 23 in an upright position.

The top of the box 23 has a convex shaped cover 34 which comprises a sheet metal wall reinforced with a plurality of U-shaped and longitudinally spaced beams 36. As shown in FIG. 2, the lower side section 37 of the cover 34 is secured to the top of the side wall 27 and projects in a tangential relation therewith. From the side section 37 the cover 34 curves upwardly toward the opposite side wall 26 with a curvature which is substantially equal to the curvature of the bottom wall 24. The radius of curvature of the cover 34 of the opposite side wall 38 increases toward the lower edge of the cover 34 thereby positioning the lower end section of the side wall 38 outwardly and laterally from the top of the side wall 26 forming an opening or passage 39 into the interior of the box 23.

As shown in FIG. 3, the forward end of the box 23 is closed with an upright front end wall 41 which is joined to the forward end of the bottom wall 24 and the forward end of the side walls 26 and 27. An angle beam 42 is secured to the top section of the front end wall 41 and extends laterally from the side wall 26 to maintain the outward position of the side wall 38 of the cover 34. A skirt 43 having an arcuate shape is fastened to the forward edge of the cover 34 and extends downwardly therefrom to partially close the upper opening into the box 23.

As shown in FIG. 5, an upright back end wall 44 extends transversely between the side walls 26 and 27 and has opposite end sections secured to the rear end sections of the side walls 26 and 27. An angle beam 46 is fastened to the top edge of the back wall 44 and extends transversely of the box 43. The angle beam 46 extends laterally from the side wall 26 and provides support for the side wall 38 of the cover 34. A semicircular shaped wall 47 is secured to the rear end of the cover 34 and closes the opening between the cover and the angle beam 46.

The opening below the back wall 44 defined by the semicircular bottom wall 24 is closed by a door 48 which is of a semicircular shape corresponding to the shape of the opening. Hinge members 49 pivotally mount the door 48 on the lower section of the back wall 44 for movement about the horizontal axis. The door 48 is maintained in a closed position by a pair of lock members 51 pivotally mounted on the bottom portion of the door. Each lock member 51 has a downwardly extended finger 52 which is movable into and out of an aligned hole in the bottom wall 24. When the fingers 52 are in their respective holes the door 48 is in a closed position.

The mid-section of the lower part of the door 48 is provided with an opening 53 which is normally closed by a slide gate 54. Guide members 56 secured to the door 48 on opposite sides of the opening 53 slidably mount the gate 54 in an overlying position with respect to the opening 53.

The bulk material 57 carried by the box 23 is discharged through the side opening 39 by a driven flail assembly 58 which extends longitudinally of the box between the end walls 41 and 44. As shown in FIG. 6, the flail assembly 58 comprises a shaft or rotor 59 having stub shafts 61 and 62 at the opposite ends thereof. The stub shafts 61 and 62 are rotatably mounted in bearing blocks 63 and 64. A plurality of radially extended ears 66 are secured to the rotor 59. The ears 66 are longitudinally spaced along the rotor 59 and are angularly spaced from each other to form a spiral pattern along the length of the rotor 59. The number and spacing of the ears 66 on the rotor 59 may vary to dynamically balance the rotor and provide an even discharge of forage from the wagon box. A flexible flail unit 67 is connected to the outer end of each ear 66. The flail unit 67 including the flail hammers 71 has a length which is slightly shorter than the radius of the bottom wall 24 of the box so that when the flail unit is rotated by the rotor 59 the flail hammers 71 are in a clearance relation with the bottom wall 24 and the side walls 26 and 27 of the box.

As shown in FIG. 8, the flail unit 67 comprises a link chain 68 which is secured by a bolt and nut assembly 69 to the ear 66. Linked to the outer end of the chain 68 is a flail hammer 71 which includes an eye bolt 72 carrying a nut 73. A square washer 74 is slidable on the bolt 72 and retained thereon by the nut 73. As shown in FIG. 9, the peripheral edges of the square washer 74 taper outwardly forming cutting edges. The washer 74 being slidable axially on the bolt 72 is self-cleaning during movement of the flail hammer 71.

As shown in FIG. 3, the front end wall 41 has an upwardly extended slot 76 in the mid-section thereof. The rotor stub shaft 61 projects through the slot 76 positioning the bearing block 63 adjacent the outside surface of the end wall. The bearing block 63 is slidable in a pair of U-shaped upright track members 77 and 78 which are secured to the end wall 41 on opposite sides of the upright slot 76. As shown in FIG. 5, the back end wall 44 has an upright slot 79 along its midsection. The slot 79 is in longitudinal alignment with the slot 76. The slots 76 and 79 each have a length which is substantially equal to the height of the box side walls 26 and 27. The rotor stub shaft 62 projects through the slot 79 positioning the bearing block 64 adjacent the outside surface of the end wall 44. A pair of upright track members 81 and 82 having a U-shaped cross section are secured to the end wall 44 adjacent the opposite side of the slot 79. The bearing block 64 is slidable in the channel formed by the U-shaped members 81 and 82.

The longitudinal position of the rotor 59 in the box 23 is maintained by collars 83 and 84 which are secured to the stub shafts 61 and 62 and engage the outside surfaces of the track members 77, 78 and 81, 82, respectively. The upright track members on the opposite end walls of the box permit the bearing blocks 63 and 64 to slide in an upright plane carrying the rotor 59 in upward and downward directions. The elevation of the rotor 59 is controlled by a hand operated winch unit 86 mounted on the top section of the side wall 26 adjacent the end wall 41 (FIG. 3).

As shown in FIG. 6, the winch unit 86 comprises a worm and worm gear drive 87 having a forwardly extended driven shaft 88. The free end of the shaft 88 terminates in the crank handle 89. A bracket 91 secured to the box side wall 26 maintains the shaft 88 in a forward position, positioning the crank handle 89 in a location where it is accessible to the operator of the vehicle towing the wagon. The drive unit 87 has a driven shaft 92 extended transversely into the box 23.

As shown in FIG. 7, a cable 93 is retained on the shaft 92 by a transverse pin 94. The cable 93 extends around the pin 94 and is wound in opposite directions on either side of the pin. The opposite end sections of the cable 93 extend into tubular members 96 and 97 which are secured to the top of the side wall 26.

As shown in FIG. 3, the tubular member 96 forms a guide for the cable 93 and is bent to position the end of the cable above the bearing block 63. A clamp 98 secures the end of the cable 93 to the top of the bearing block 63. As shown in FIG. 6, the tubular member 97 is curved to direct the opposite end of the cable 93 in alignment with the bearing block 64. A clamp 99 secures the cable to the top of the block 64.

In order to raise the flail rotor 59 the cable 93 is wound upon the drive shaft 92 in response to manual operation of the crank handle 89 in one direction. The cable 93 slides in the tubular members 96 and 97 carrying the blocks 63 and 64 upwardly in the channels formed by the upright track members 77, 78 and 81, 82, respectively. When the cable 93 is unwound from the shaft 92 by the manual rotation of the crank handle 89 in the opposite direction, the combined weight of the rotor 59 and the flail unit 67 lowers the elevation of the rotor 59. Thus, by manually rotating the crank 89 the relative elevational position of the rotor 59 with respect to the bottom wall 24 of the box may be changed within the limits established by the length of the slots 76 and 79 in the box end walls 41 and 44, respectively.

The drive mechanism between the power takeoff shaft of the wagon towing tractor (not shown) and the flail rotor 59 is shown in FIG. 3. A drive pulley 101 is secured to a longitudinally extended drive shaft 102. Bearings 103 and 104 rotatably mount the drive shaft 102 on the lower section of the front end wall 41. The bearing 103 is mounted on the end wall 41 and a bracket 106 positions the bearing 104 forwardly of the pulley 101. As shown in FIG. 1, the forward end of the drive shaft 102 carries a universal joint 107 which is connected to a power take-off coupling shaft 108.

Figure 4:
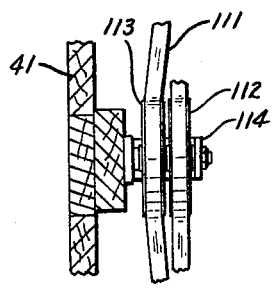
FIG. 4 is an enlarged cross sectional view taken along the line 4—4 of FIG. 3.

A driven pulley 109 is secured in a driving relation to the rotor stub shaft 61. The torque of the drive pulley 101 is transmitted to the driven pulley 109 by an endless belt 111 which extends over the drive pulley 101 and the driven pulley 109. As shown in FIGS. 3 and 4, the mid-section of the belt 111 passes over a pair of idler pulleys 112 and 113 which are secured to the front end wall 41 adjacent the side wall 26 by a U-shaped bracket 114.

The idler pulleys 112 and 113 are rotatably mounted side-by-side and are positioned in a horizontal plane which extends substantially through the mid-point of the slot 76. In this position the shortest distance between the axis of rotation of the flail rotor 59 and the axis of rotation of the idler pulleys 112 and 113 exists when the rotor 59 is at an elevation which is midway between the ends of the slots 76 and 79 in the end walls of the box, as shown by the broken lines in FIG. 3. The slack in the belt 111 caused by the change in the distance between the axis of rotation of the rotor 59 and the axis of rotation of the idler pulleys 112 and 113 is compensated by a belt tensioning unit 116 pivotally mounted on the forward end wall 41.

The tensioning unit 116 comprises a T-shaped lever 117 pivotally mounted at its mid-portion on a stub axle 118 secured to the end wall 41. Rotatably mounted on opposite ends of the aligned portion of the lever 117 are idler pulleys 119 and 121. The belt 111 runs between the pulleys 119 and 121 with the pulleys 119 and 121 engaging opposite sides of the belt 111. A spring 122 connected to the end wall 41 and the trunk of the T-shaped lever 117 biases the pulleys 119 and 121 into engagement with the belt 111. The biasing force of the spring 122 establishes the tension of the belt 111. When the flail rotor 59 is in horizontal alignment with the idler pulleys 112 and 133 the spring 122 rotates the T-shaped lever 117 to maintain the tension on the belt 111 to a position shown by the broken lines in FIG. 3.

An auxiliary pulley 123 is rotatably mounted on the front end wall 41 below the drive pulley 101 and is usable to drive an auger assembly (not shown) which may be placed on the bottom wall 24 of the box. The pulleys 101 and 123 are in vertical alignment and are adapted to be drivably coupled by a belt (not shown).

As shown in FIGS. 2 and 3, the opening 39 along the side of the wagon box 23 may be closed by a door 124 which is pivotally mounted by a hinge connection 126 to the top section of the side wall 26. The door 124 projects in an upward direction and extends the entire length of the wagon box. As shown in FIG. 3, a crank arm 127 is connected to the door and engages an arcuate rack 128 secured to the front end wall 41. The relative position between the crank arm 127 and the rack 128 is manually varied to move the door 124 between open and closed positions as shown by the full and broken lines in FIG. 2.

In order to carry the bulk material discharged through the opening 39 laterally from the wagon box 23 a triangular-shaped chute 129 is positioned below the opening 39. The top section of the chute is pivotally mounted on the outside of the side wall 26 by a hinge connection 131 immediately below the hinge connection 126 for the door 124. The chute 129 has a triangular base 132 and upright side walls 133 and 134 which converge toward a central opening 136. The angular position of the chute 129 is adjustable and maintained by a strut 137 pivotally mounted to the bottom section of the base wall 132 by hinge connection 138. The opposite end of the strut 137 is retained in an upright rack 139 secured to the beam 28 of the box 23.

In use, when the bulk material 57 in the wagon box 23 is to be unloaded into a feed bunk 141 as shown in FIG. 2 the wagon is positioned alongside the bunk with the chute 129 extended over the bulk material receiving portion of the bunk. Operation of the power take-off drive of the tractor rotates the drive pulley 101 effecting movement of the belt 111 in the direction of the arrow 142 shown in FIG. 3. The belt 111 rotates the pulley 109 which in turn rotates the flail rotor 59. Rotation of the rotor 59 moves or swings the flail units 67 in a circular path such that the centrifugal force resulting from the weight of the flail hammers 71 positions each of the flail units substantially radially of the rotor 59.

As shown in FIG. 2, the flail hammers 71 engage the top surface of the bulk material 57 and carry portions of the bulk material in an upward direction along the curvature of the cover 34. The flail hammers impart movement to the bulk material which is in a direction tangential to the circular path of movement of the flail hammers 71. The bulk material follows the curvature of the inside surface of the cover 34 and is directed through the opening 39 onto the base wall 132 of the chute 129. The bulk material on the sloping base wall 132 falls downwardly and is guided by the upright side walls 133 and 134 to the opening 136. The bulk material falls in a uniform and continuous ribbon through the opening 136 onto the feed bunk 141.

As the bulk material 57 is removed from the box 23 the flail assembly 58 is moved as a unit in a downward direction so as to maintain the flail hammers in an engaging relationship with the top surface of the bulk material 57. The lowering of the flail assembly 58 is accomplished by the manual rotation of the crank handle 89 in a direction which unwinds the cable 93 from the drive shaft 92 of the winch unit 86. As the cable is unwound from the shaft 92 the weight of the flail assembly 58 moves the bearing blocks 63 and 64 downwardly along the upright track members 77, 78 and 81, 82. The flail assembly 58 moves in a downward direction until the flail hammers 71 move in a path which is contiguous with the curved bottom wall 24 of the box. The moving hammers 71 collect substantially all of the bulk material in the box 23 for discharge through the opening 39. After the wagon box 23 has been emptied of bulk material, the flail assembly 58 is raised by the manual operation of the winch unit 86.

A modified flexible flail unit 143 is shown in FIG. 12. The flail unit 143 comprises a flexible cable 144 which extends around a bolt and nut assembly 146 extended through an ear 66 of the rotor 59. A clamp 147 retains the cable 144 about the nut and bolt assembly 146. A flail hammer 148 is pivotally connected to the outer end of the cable 144 and comprises a tubular member 149 having a transverse pin 151. The cable 144 extends about the pin 151 and is retained in this position by a clamp 152. To increase the cutting effectiveness of the hammer 48 a transverse outwardly curved rod 153 projects laterally from and is secured to the outer end of the tubular member 149.

In summary, the wagon 15 has a box 23 for carrying bulk material. A driven flail assembly 58 is rotatably mounted on the end walls of the wagon box and operates to discharge bulk material out of the side of the box. In addition, the flail assembly 58 is guidably mounted on the end walls for movement along an upright plane. As the bulk material is being removed from the box 23, the flail assembly 58 is lowered so as to provide a continuous discharge of bulk material from the side of the wagon box. After the wagon box has been emptied the flail assembly 58 is raised thereby placing the wagon in a condition to be refilled with bulk material.

While there have been shown, described, and pointed out the fundamental novel features of the invention, it is to be understood that various omissions, substitutions, changes in form, and details of the apparatus illustrated may be made by those skilled in the art, without departing from the spirit of the invention. The invention is intended to be limited only as indicated by the scope of the following claims.

I claim:
1. A bulk material handling apparatus comprising:
 (a) box means having a semicircular bottom wall, upright end walls and side walls secured to the bottom wall, and a convex curved top wall having one side in alignment with and secured to one of the side walls and the opposite side positioned outwardly and laterally from the other side wall providing an opening into the box means,
 (b) chute means pivotally mounted on said other side wall below said opening and operable to direct bulk material away from the box means,
 (c) a flail assembly having a rotor extended longitudinally of the box means and a plurality of flexible means secured at one end thereof to the rotor along the length thereof,
 (d) means including upright guide members secured to the end walls of the box means and slide members positioned in said guide members for movement in an upright plane and rotatably mounting the opposite end sections of the rotor, (e) drive means mounted on one of the end walls and connected to the rotor for transmitting power to rotate the rotor in a direction whereby the flexible means carry the bulk material in the box means along the curved top wall to the chute means through the opening between the other side wall and the top wall, and (f) winch means having cables connected to the slide members and operable to move the rotor in an upright plane toward and away from the bottom wall.

2. The apparatus defined in claim 1 including:
(a) door means pivotally mounted on the other side wall adjacent said opening, said door means operable to open and close said opening, and
(b) means connected to the door means for holding the door means in selected position thereby varying the side of said opening.

3. The apparatus defined in claim 1 wherein:
(a) the flexible means comprise link chains and hammer units secured to the outer ends of the chains, each of said link chains and hammer units having a combined length slightly shorter than the radius of the semicircular bottom wall.

4. The apparatus defined in claim 1 wherein:
(a) the flexible means comprise cables and tubular hammer units pivotally connected to the outer section of the cables, each of said cables and hammer units having a combined length slightly shorter than the radius of the semicircular bottom wall.

5. A bulk material handling apparatus comprising:
(a) box means having a semicircular bottom wall, upright end walls and side walls secured to the bottom wall, and a convex curved top wall having one side in alignment with and secured to one of the side walls and the opposite side positioned outwardly and laterally from the other wall providing a downwardly facing and horizontally extended discharge opening for the box means, a flail assembly having a rotor extended longitudinally of the box means and a plurality of flexible means secured at one end thereof to the rotor along the length thereof,
(c) means rotatably mounting opposite end portions of the rotor on the end walls, said means including guide means positioning said rotor for movement in an upright plane extended longitudinally of the box means,
(d) means connected to the rotor mounting means and operable to move the rotor in an upright plane toward and away from the bottom wall,
(e) drive means connected to the rotor for transmitting power to rotate the rotor in a direction whereby the flexible means carries the bulk material in the box means in a discharge path along the curved top wall and through the discharge opening, with the bulk material following said discharge path regardless of the vertical position of said rotor.

6. The invention according to claim 5 in which the opposite side of the convex curved top wall has a curvature of progressively increasing radius toward said discharge opening.

7. A bulk material handling apparatus comprising:
(a) box means for storing bulk material, said box means having a bottom wall, upright side walls, upright end walls, and a convex curved top wall having one side in alignment with and secured to one of the side walls and the opposite side extended over the other side wall terminating laterally from said other side wall providing an upright passage into the box means,
(b) a flail assembly having a rotor extend longitudinally of the box means and a plurality of flexible means secured to the rotor along the length thereof,
(c) means rotatably mounting opposite end portions of the rotor on the end walls, (d) drive means connected to one end of the rotor for transmitting power to rotate said rotor in a direction whereby the flexible means moves the bulk material in the box means along the top wall to the passage,
(e) door means pivotally mounted on the other side wall adjacent said passage, said door means operable to open and close said passage, to control the rate of bulk material discharge, and
(f) means connected to the door means for holding the door means in a selected position thereby varying the size of said passage.

8. A bulk material handling apparatus comprising:
(a) box means for storing bulk material, said box means having a bottom wall, upright side walls, upright end walls, and a convex curved top wall having one side in alignment with and secured to one of the side walls and the opposite side extended over the other side wall terminating laterally from said other side wall providing an upright passage into the box means,
(b) a flail assembly having a rotor extended longitudinally of the box means and a plurality of flexible means secured to the rotor along the length thereof,
(c) means rotatably mounting opposite end portions of the rotor on the end walls,
(d) drive means connected to one end of the rotor for transmitting power to rotate said rotor in a direction whereby the flexible means moves the bulk material in the box means along the top wall to the passage, and
(e) chute means pivotally mounted on said other side wall below said passage, said chute means extended downwardly and outwardly for directing bulk material laterally of the box means.

9. A bulk material handling apparatus comprising:
(a) box means having a semicircular bottom wall, upright end walls and side walls secured to the bottom wall, and a convex curved top wall having one side in alignment with and secured to one of the side walls and the opposite side positioned outwardly and laterally from the other side wall providing an opening into the box means,
(b) a flail means having a rotor extended longitudinally of the box means,
(c) means rotatably mounting opposite end portions of the rotor on the end walls,
(d) drive means mounted on one of the end walls and connected to the rotor for transmitting power to rotate the flail means in a direction to carry the bulk material in the box means along the curved top wall for discharge through the opening between the other side wall and the top wall,
(e) door means pivotally mounted on the other side wall adjacent said opening, said door means operable to vary the size of said opening to control the rate of bulk material discharged from said box means, and
(f) means connected to the door means for holding the door means in a selected position.

10. A bulk material handling apparatus comprising:
(a) box means having a semicircular bottom wall, upright end walls and side walls secured to the bottom wall, and a convex curved top wall having one side in alignment with and secured to one of the side walls and the opposite side positioned outwardly and laterally from the other side wall providing an opening into the box means,
(b) a flail means having a rotor extended longitudinally of the box means,
(c) means rotatably mounting opposite end portions of the rotor on the end walls,
(d) drive means mounted on one of the end walls and connected to the rotor for transmitting power to rotate the flail means in a direction to carry the bulk material in the box means along the curved top wall for discharge through the opening between the other side wall and the top wall, and
(e) chute means pivotally mounted on said other side wall below said opening and operable to direct bulk material away from the box means.

References Cited by the Examiner

UNITED STATES PATENTS

| | | | |
|---|---|---|---|
| 1,224,290 | 5/1917 | Eiermann | 214—508 |
| 1,225,802 | 5/1917 | Greenawalt | 302—37 |
| 1,807,496 | 5/1931 | Robinson | 222—556 |
| 2,302,840 | 11/1942 | Chartrand | 214—83.26 |
| 2,574,792 | 11/1951 | Love | 214—83.26 |
| 2,712,412 | 7/1955 | West | 302—37 |
| 2,789,739 | 4/1957 | Aller | 222—556 |
| 2,886,332 | 5/1959 | Elwick | 275—3 |
| 2,946,629 | 7/1960 | Headley | 302—37 |
| 2,957,698 | 10/1960 | Martens | 275—3 |
| 3,011,793 | 12/1961 | McElhinney et al. | 275—3 X |
| 3,043,465 | 7/1962 | Horner. | |
| 3,121,568 | 2/1964 | Wilkes et al. | 175—45 X |

GERALD M. FORLENZA, *Primary Examiner.*

A. J. MAKAY, *Assistant Examiner.*